No. 864,824. PATENTED SEPT. 3, 1907.
J. S. BARNES.
VARIABLE SPEED GEARING.
APPLICATION FILED JUNE 6, 1907.

Witnesses:
C. B. Clark
E. Behel

Inventor:
John S. Barnes
By A. O. Behel
Atty.

UNITED STATES PATENT OFFICE.

JOHN S. BARNES, OF ROCKFORD, ILLINOIS, ASSIGNOR TO W. F. & JOHN BARNES COMPANY, OF ROCKFORD, ILLINOIS, A CORPORATION OF ILLINOIS.

VARIABLE-SPEED GEARING.

No. 864,824.      Specification of Letters Patent.      Patented Sept. 3, 1907.

Application filed June 6, 1907. Serial No. 377,601.

*To all whom it may concern:*

Be it known that I, JOHN S. BARNES, a citizen of the United States, residing at Rockford, in the county of Winnebago and State of Illinois, have invented certain new and useful Improvements in Variable-Speed Gearing, of which the following is a specification.

The object of this invention is to impart to a driven member variable speeds from a constant driving member.

Figure 1:
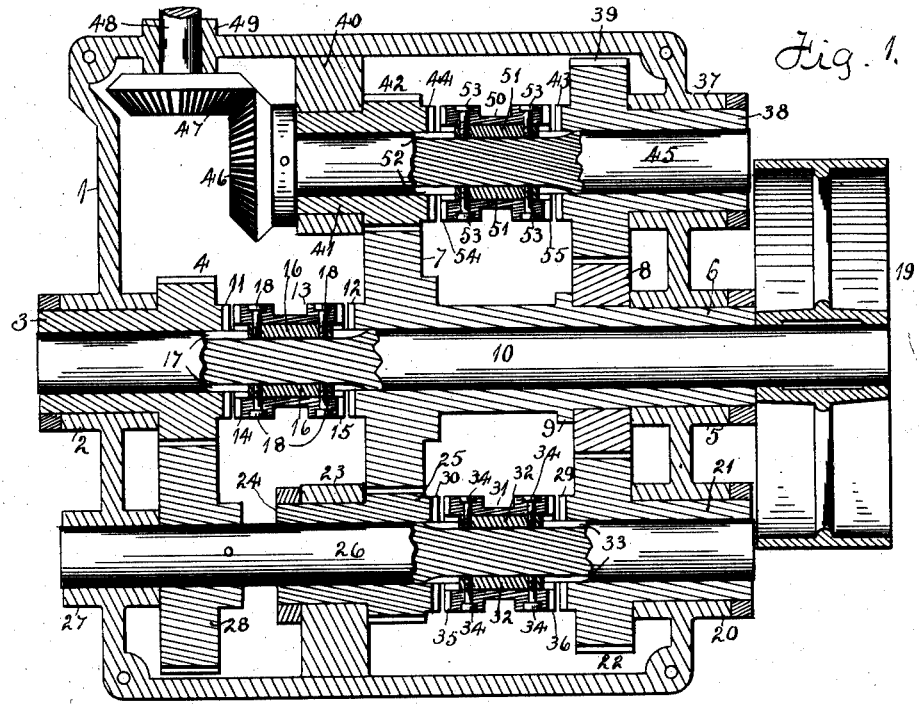
Figure 2:
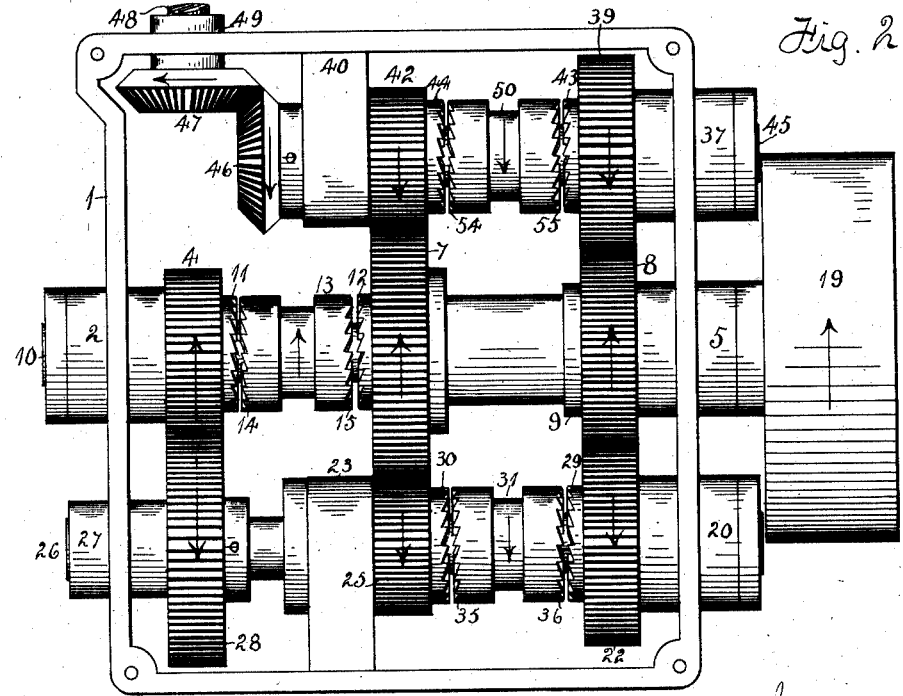

In the accompanying drawings. Figure 1 is a section through a casing and the operative parts supported thereby. Fig. 2 is a view of the casing and operative parts, in which one face of the casing has been removed.

The casing 1 may be of any suitable construction adapted to support the operative parts. The bearing 2 supports the hub 3 of a spur gear 4, and the bearing 5 supports the hub 6 of a spur gear 7. On the hub 6 is fixedly mounted a spur gear 8 which is pressed against the annular ring 9 extending from the hub 6. A driving shaft 10 is located within the hubs 3 and 6 in a manner to rotate freely therein. The spur gear 4 has a clutch face 11, and the spur gear 7 has a clutch face 12. A clutch section 13 has its faces 14 and 15 in clutch form and is located on the driving shaft 10 between the spur gears 4 and 7. This clutch section has a driving connection with the driving shaft by means of the keys 16 located in the key-ways 17 formed in the driving shaft and held in connection with the clutch section by the screws 18. To the projecting end of the driving shaft is fixedly connected a driving pulley 19. The clutch section 13 rotates with the driving shaft 10 and is movable into engagement with the spur-gears 4 and 7, thereby imparting the rotary movement of the driving shaft to both of said gears, but only one at a time. The bearing 20 supports the hub 21 of a spur-gear 22 and a bearing 23 supports the hub 24 of a spur gear 25 in a manner to permit both to revolve therein. A sub-shaft 26 is supported by the hubs 21 and 24 and a bearing 27 in a manner to permit it to revolve. A spur gear 28 has a fixed connection with the sub-shaft 26.

The spur gear 22 is provided with a clutch face 29, and the spur-gear 25 has a clutch face 30. A clutch section 31 is supported by the sub-shaft 26, and has a driving connection therewith through the keys 32 located in the key-ways 33 formed in the sub-shaft. The keys are held in connection with the clutch section by the screws 34. This clutch section has clutch faces 35 and 36 which are capable of being moved into engagement with the clutch face of the spur-gears 22 and 25, but only one at a time, in order that the rotations of the sub-shaft may be communicated to the spur-gears 22 and 25. The bearing 37 supports the hub 38 of the spur-gear 39, and the bearing 40 supports the hub 41 of the spur-gear 42. The spur-gears 39 and 42 are provided with clutch faces 43 and 44 respectively. A driven shaft 45 is supported by the hubs 38 and 41 in a manner to rotate, and to one end of this shaft is fixedly connected a bevel gear 46 which meshes with a bevel gear 47 connected to the shaft 48 which is supported in a bearing 49 formed in the casing.

A clutch section 50 is supported by the driven shaft 45 and is located between the spur gears 39 and 42, and has a driving connection with the shaft by the keys 51 located in the key-ways 52 formed in the shaft. These keys 51 are connected with the clutch section by the screws 53. This clutch section has clutch faces 54 and 55. This clutch section is capable of being placed in engagement with the clutch face of the spur gears 39 and 42.

The levers for shifting the clutch sections are not shown, as any suitable arrangement of shifting mechanism may be employed.

As the driving shaft 10 is constantly rotating, for instance, at a given speed, the clutch section 13 will also rotate at that speed. By moving the clutch section 13 into engagement with the spur gear 7 and the clutch section 50 into engagement with the spur gear 42, a given speed will be imparted to the driven shaft 45. By moving the clutch section 13 into engagement with the spur gear 4, moving the clutch section 31 into engagement with the spur gear 25 and moving the clutch section 50 into engagement with the spur gear 42 another speed will be imparted to the driven shaft 45. By moving the clutch section 13 into engagement with the spur gear 4, moving the clutch section 31 into engagement with the spur gear 22 and moving the clutch section 50 into engagement with the spur gear 39 another speed will be imparted to the driven shaft 45. By moving the clutch section 13 into engagement with the spur gear 7, the spur gear 8 will also be rotated, and by moving the clutch section 50 into engagement with the spur gear 39 another speed will be imparted to the driven shaft 45. By moving the clutch section 13 to engage with the spur gear 4, moving the clutch section 31 into engagement with the spur gear 25 the spur gear 8 will be rotated, and by moving the clutch section 50 into engagement with the spur gear 39, another speed will be imparted to the driven shaft 45. By moving the clutch section 13 into engagement with the spur gear 4, moving the clutch section 31 into engagement with the spur gear 22, the spur gear 7 will be rotated, and by moving the clutch section 50 into engagement with the spur gear 42, another speed will be imparted to the driven shaft 45.

By the above manipulations it is clear that six different speeds can be imparted to the driven shaft 45 from the constantly rotating driving shaft 10.

This variable speed gearing is especially adapted for drilling machines but may be found useful in other machines.

I claim as my invention.

A variable speed gearing comprising a suitable support, a driving shaft, a sub-shaft and a driven-shaft held in proper relation by the support, a spur gear loosely mounted on the driving shaft and provided with a clutch face, a spur gear fixedly connected to the sub-shaft and meshing with the above mentioned gear on the driving shaft, two gears of varying diameters mounted on the driving shaft to revolve in unison, one of said gears provided with a clutch face, a movable double faced clutch section having a driving connection with the driving shaft and adapted to engage the clutch faces of the gears on the driving shaft, two spur gears of varying diameters loosely mounted on the sub-shaft and each provided with a clutch face and in mesh with the two connected gears on the driving shaft, a movable double faced clutch section having a driving connection with the sub-shaft and adapted to engage the clutch faces of the gears on the sub-shaft, two spur gears of varying diameters loosely mounted on the driven shaft and each provided with a clutch face, and in mesh with the two connected gears on the driving shaft, and a movable double faced clutch section having a driving connection with the driven shaft and adapted to engage the clutch faces of the gears on the driven shaft.

In testimony whereof I have hereunto set my hand in presence of two subscribing witnesses.

JOHN S. BARNES.

Witnesses:
  A. O. BEHEL,
  E. D. E. N. BEHEL.